Patented June 28, 1949

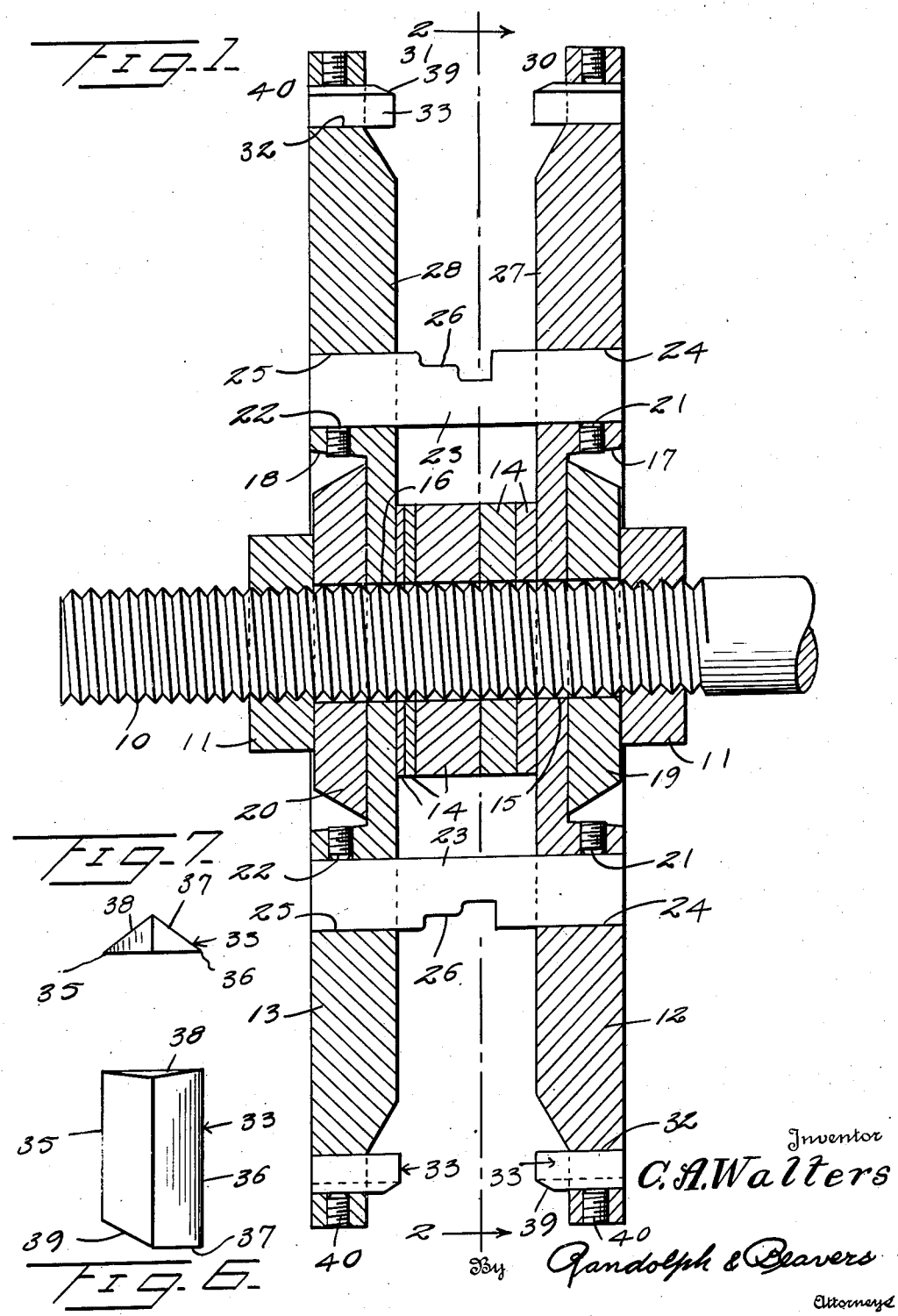

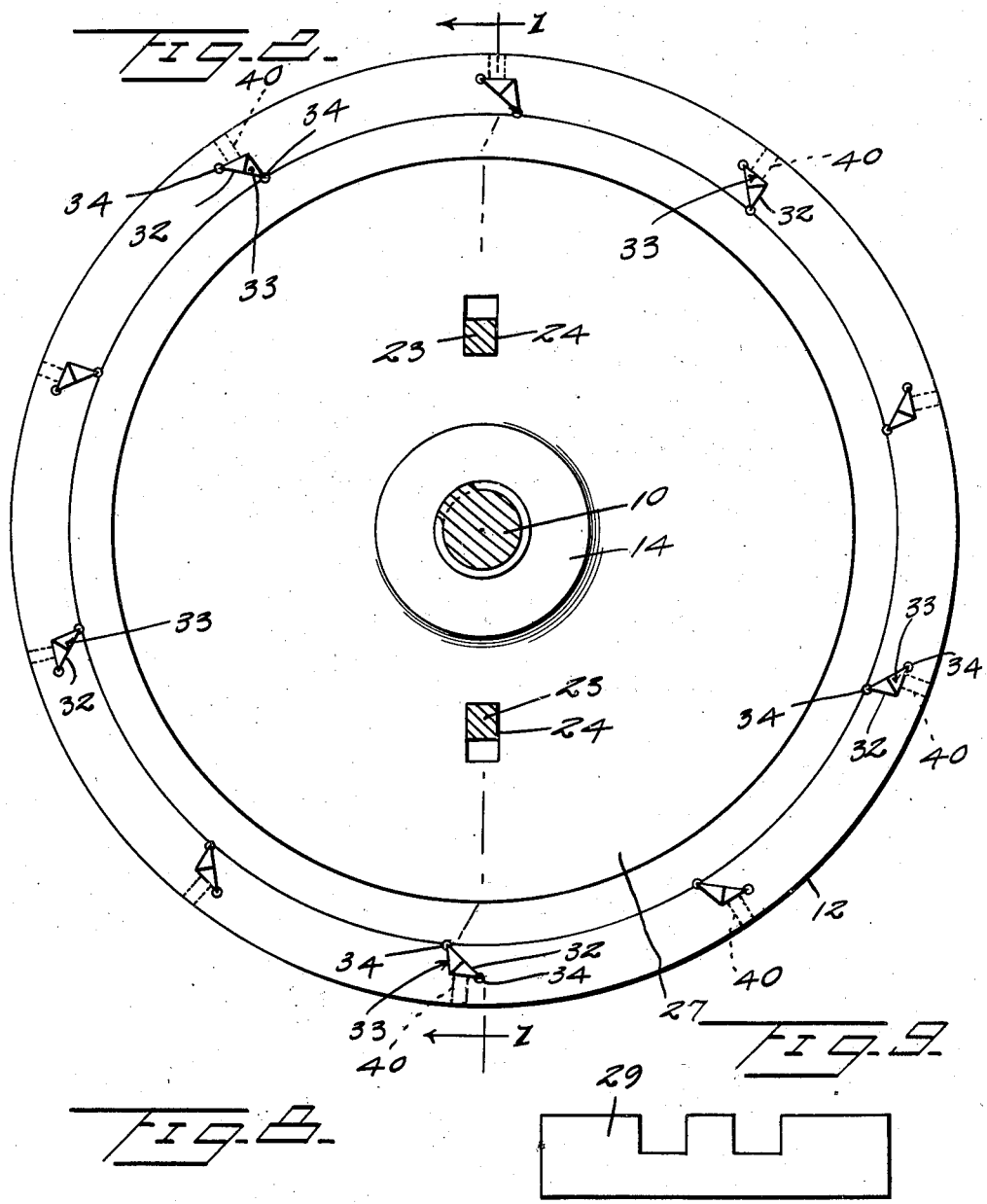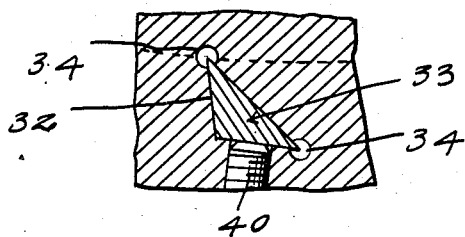

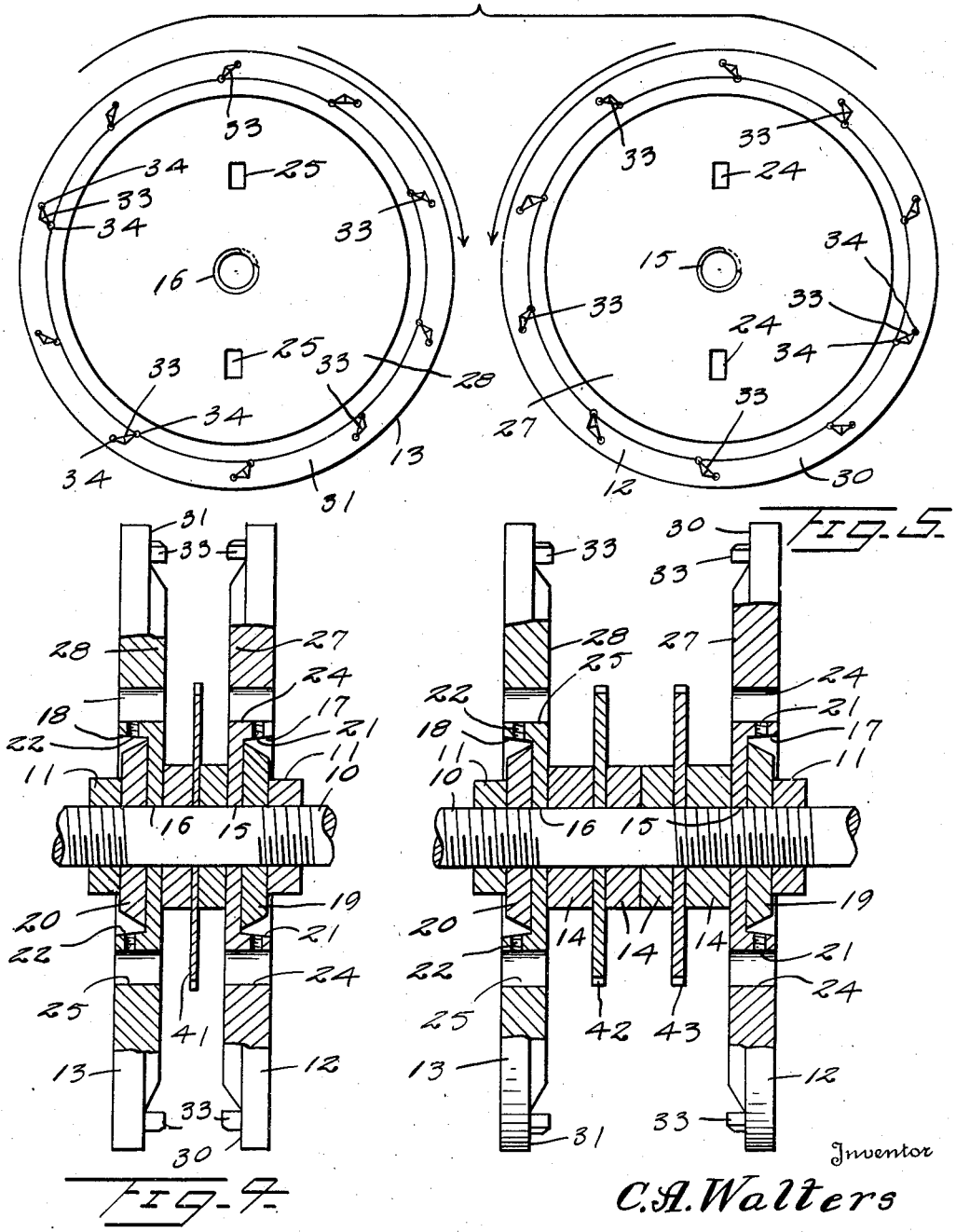

2,474,559

UNITED STATES PATENT OFFICE 2,474,559

CIRCULAR BURNISHER PLANER AND MOLDING HEAD

Charles A. Walters, Portsmouth, Ohio

Application May 28, 1945, Serial No. 596,123

2 Claims. (Cl. 144—218)

This invention relates generally to woodworking devices and more particularly to a new and improved fast cutting circular burnisher planer and moulding head for use in performing various operations such, for example, as planing, polishing, moulding, shaping, paneling, rabbeting, routing, tenoning and mortising on wood, or the like, two or more of the operations being performed simultaneously or separately, as desired.

More specifically, the present invention contemplates the provision of a dual circular burnisher and planer having left and right cutting disks adapted to be mounted in fixed spaced relation on a common mandrel therefore and adapted to carry a plurality of moulding bits or cutters therebetween, if desired, an important object being to arrange the various cutters of the burnisher planer so that a piece of lumber may be planed on both sides thereof and moulded on one edge thereof simultaneously in one operation.

Another object is to provide a cutter for use with a circular burnisher planer in which the cutter is so formed as to provide a plurality of cutting edges thereon suitable for use in making shearing, planing and burnishing operations.

A further object is to provide a circular burnisher planer which may be used together with a suitable fence or guide in planing the four sides of a piece of lumber consecutively.

A still further object is to provide a circular burnisher planer which also may serve as a gauge in planing and burnishing a piece of lumber to desired dimensions.

Still other objects, advantages and features of the invention are those inherent in the novel construction, combination and arrangement of parts as will become more clearly apparent as the description proceeds, reference being had to the accompanying drawings, wherein:

Figure 1 is a sectional view of the dual right and left circular burnisher planer of the present invention according to a preferred embodiment thereof, the section being taken substantially along the line 1—1 of Figure 2;

Figure 2 is a sectional view of the burnisher planer as seen along the line 2—2 of Figure 1;

Figure 3 is a combined view illustrating the right and left burnisher planers in elevation in order to show the staggered relation of the cutters of one planer relative to the cutters of the other planer;

Figure 4 is a somewhat smaller sectional view of the dual right and left planer shown in Figure 1 with the moulding bits removed therefrom and with a circular saw disposed therebetween on the mandrel;

Figure 5 is a sectional view of a burnisher planer arrangement similar to that of Figure 4 except that a pair of circular cutters are disposed in spaced relation on the mandrel between the right and left planers;

Figure 6 is a somewhat enlarged detail view of one of the plurality of cutter elements employed in the dual burnisher planer shown in Figures 1 through 5;

Figure 7 is an end view of the cutter shown in Figure 6;

Figure 8 is a fragmentary sectional view of a cutter and mounting opening therefore, and Figure 9 is a view in elevation of a moulding bit suitable for use with the dual burnisher planer and moulding head of the present invention.

Referring now to the drawings and more particularly to the Figures 1 to 3 in which the dual burnisher planer and moulding head is set up for making sash rails, 10 designates a conventional woodworking mandrel which is threaded over a substantial length thereof to receive a pair of threaded members 11 between which are clamped right and left cutting disks 12 and 13, respectively; a suitable number of washer-shaped spreader or spacer members 14 being interposed therebetween to provide the desired spacing between the disks.

Disks 12 and 13 are each provided with central openings 15 and 16 to receive mandrel 10 concentrically therewith and are counterbored as at 17 and 18, respectively, to receive tapered supporting washers 19 and 20, respectively. The tapered washers 19 and 20 render set screws 21 and 22, respectively, associated with disks 12 and 13 accessible for adjustment of moulding bits or cutters 23 which are supported by disks 12 and 13 within non-circular openings 24 and 25, respectively, formed therein.

The moulding bits 23 are disposed equidistantly from the center of mandrel 10 and adjusted transversely of disks 12 and 13 such that the profiling edge 26 thereof is disposed the proper distance from cheeks or jaws 27 and 28 of the disks, respectively. It will be understood that while provision for but two bits 23 are shown in Figures 1 through 3, additional openings 24 and 25 may be provided, if desired. Moreover, it will be understood that bits or cutters 23 having an infinite variety of profiles may be used, a bit 29 having a profile different from that shown in Figure 1, for example, being shown in Figure 9.

The outer edges of disks 12 and 13 are reduced as at 30 and 31, respectively, and the reduced portions thereof are provided with a plurality of circumferentially spaced, triangular openings 32 for receiving a plurality of triangular-shaped cutter or blade elements 33 transversely of the disks. Circular openings 34 are provided at opposite corners of each of triangular openings 32 to prevent contact of the cutting edges of cutter elements 33 therewith, thereby to prevent premature dulling of the cutter elements.

Each of cutter or blade elements 33 is formed so as to provide five cutting edges of which edges 35 and 36 are used for planing and, for this purpose, these cutting edges are chisel-ground. Edges 37 and 38 are used for burnishing, edges 35 and 36 being employed to cut away the surplus wood except for a fraction thereof which is removed in the burnishing operation. Edge 39 is employed for shearing, being a fast cutting edge due to the fact that, in operation, it does not cut directly across the grain of the wood and therefore may be used in making heavy cuts therein.

The burnishing and shearing edges 37, 38 and 39 are formed by grinding each of the ends of each cutter element 33 to a slight bevel as best seen in Figure 6. It will be understood that the shearing edges are formed as rights or lefts, as the case may be, and, accordingly, must be used on the proper right or left disks 12 and 13. The other cutting edges, however, may be used on either disk and the cutting element may be turned about within the opening 32 therefore, being retained within the opening and securely projected the desired distance within the region between cheeks 27 and 28 by means of suitable set screws 40.

Referring now to Figure 4, the dual burnisher planer is shown arranged for making stops, or the like joinery operations, a disk saw 41 being employed for this purpose and locked for rotation with mandrel 10 between a pair of spreaders 14 thereon. In Figure 5 the burnisher planer is set up for making stiles or like joinery operations, the planer, for this purpose, employing a pair of spaced cutters 42 and 43 locked between spreaders 14 for rotation with mandrel 10.

From the foregoing it should now be apparent that a wide variety of suitable blades, cutters, saws, moulding bits and the like may be employed for performing various operations on wood; cutter elements 33 on disks 12 and 13 and moulding bits 23 or saw 41 or cutters 42 and 43, as the case may be, performing the cutting, moulding and burnishing operations on the piece of wood or lumber as the same is fed through cheeks or jaws 17 and 28 which serve to hold the wood or lumber snugly and straight at all times.

Spreader or spacer members 14 are preferably milled to size in order to provide an accurate width of the lumber in its finished form, thus providing a burnisher planer which also serves as a gage, a sufficient number of the spreader members of proper size being employed to spread the cheeks the desired distance in each case. For this purpose, it will be apparent that a threaded length of mandrel 10 to accommodate a wide variety of lumber widths is desirable.

It will be further apparent that one of the cutter disks 12 or 13 only may be employed for cutting, the other disk being used as a fence or guide in holding the board to be planed or otherwise cut straight, however, if desired, suitable guide means other than one of the disks may be employed when one disk only is to be used. For example, in practice, it may be desired to plane to a 11½ inch width a board which is 11½ inches wide at one end and 11⅞ inches wide at the other. This may be accomplished with one cutter disk 12 or 13 by setting the fence or guide, which may be the other disk 12 or 13, 11½ inches from the cutter disk and thereafter feeding the board between the cheeks of the disk. Similarly, the four sides of a board may be planed and burnished consecutively.

In Figure 3 disks 12 and 13 are shown in elevation for the purpose of illustrating the staggered relation between the cutter elements 33 thereof, the cutter elements preferably being staggered in order to approximate a condition in which at least one cutter element is always in cutting engagement with the object being worked, thereby to insure smooth operation of the burnisher planer.

It should now be apparent that a burnisher planer has been provided which is well adapted to fulfill the aforestated objects of the invention and while the invention has been described with reference to certain adaptations thereof, it will be apparent to those skilled in the art that additional adaptations, applications, and embodiments thereof may be resorted to without departing from the spirit and scope of the invention as defined by the appended claims.

I claim as my invention:

1. In a burnisher planer and moulding head of the character disclosed, the combination of a mandrel, a pair of cutter disks disposed in spaced relation on said mandrel and secured thereto for rotation therewith, each of said cutter disks having a plurality of transverse openings of triangular cross-section disposed circumferentially thereof, a plurality of triangularly shaped cutter elements disposed slidably within said openings respectively, each of said cutter elements having a plurality of cutter edges adapted to be projected within the region between the disks, each of said cutter disks having a plurality of non-circular openings disposed circumferentially and transversely thereof, said non-circular openings being located radially inwardly of said triangular openings and the openings in one disk being axially aligned with those in the other, and a plurality of non-circular moulding bits disposed within said non-circular openings and extended between said pair of disks, said moulding bits being individually removable and adjustable relatively to the disks.

2. In a burnisher planer and moulding head of the character disclosed, the combination of a mandrel, a pair of cutter disks disposed in spaced relation on said mandrel and secured thereto for rotation therewith, each of said cutter disks having a plurality of transverse openings of triangular cross-section disposed circumferentially thereof, a plurality of triangularly shaped cutter elements disposed slidably within said openings respectively, each of said cutter elements having a plurality of cutter edges adapted to be projected within the region between the disks, each of said cutter disks having a plurality of non-circular openings disposed circumferentially and transversely thereof, said non-circular openings being located radially inwardly of said triangular openings and the openings in one disk being axially aligned with those in the other, a plurality of non-circular moulding bits disposed within corresponding non-circular openings individual to said pair of disks and extended therebetween, means for releasably retaining each of said cutter elements in adjusted position within the opening individual thereto, and means individual to each of the disks for releasably locking said moulding bits thereto.

CHARLES A. WALTERS.

REFERENCES CITED

The following references are of record in the file of this patent:

UNITED STATES PATENTS

| Number | Name | Date |
|---|---|---|
| 676,754 | Meehan | June 18, 1901 |
| 816,953 | Backman | Apr. 3, 1906 |
| 947,462 | Spieth | Jan. 25, 1910 |
| 984,407 | Wolvin | Feb. 14, 1911 |
| 996,034 | Zimmerman | June 20, 1911 |
| 1,015,927 | Arbuthnot | Jan. 30, 1912 |
| 1,426,625 | Young | Aug. 22, 1922 |
| 1,571,449 | Kandera | Feb. 2, 1926 |
| 1,838,492 | Meyers | Dec. 29, 1931 |
| 2,385,750 | Weddell | Sept. 25, 1945 |

FOREIGN PATENTS

| Number | Country | Date |
|---|---|---|
| 19,595 | Sweden | Sept. 8, 1904 |
| 336,676 | Great Britain | Oct. 20, 1930 |